April 14, 1970     D. YOUNG     3,506,213

RE-REELING DEVICE

Filed Oct. 7, 1968

Inventor,
David Young,
by Salter & Michaelson
Att'ys.

United States Patent Office 3,506,213
Patented Apr. 14, 1970

3,506,213
RE-REELING DEVICE
David Young, Main St., Oakland, R.I. 02858
Filed Oct. 7, 1968, Ser. No. 765,577
Int. Cl. A01k 89/00
U.S. Cl. 242—84.1
9 Claims

ABSTRACT OF THE DISCLOSURE

A fish line re-reeling device comprising a frame on which a fish line supply spool is mounted for rotation, the frame being mountable on a section of a fishing rod located adjacent to the reel thereof and after disconnection of the outer rod sections, the frame and supply spool being mounted for oscillating movement on the fishing rod to provide for oriented transfer of the line from the supply spool to the reel.

BACKGROUND OF THE INVENTION

It has been the custom heretofore to transfer fishing line from a supply spool to the reel on a fishing rod by either mounting the reel on a shaft and winding therefrom under applied tension or having one person hold the spool and apply a force thereto so as to restrict rotation of the spool as the line is wound therefrom onto the fishing rod, wherein proper tension is applied to the line as it is wound on the fishing reel. Unfortunately, tension of the line is inconsistent when applied to the fishing reel from the supply spool in the conventional manner; and, as a result, kinking of the line occurs, and the entangled line must be either cut free from the supply spool; or, if the kinking results in complete entanglement of the line, the spool must be discarded. Some efforts have been made heretofore to provide re-reeling devices for fishing line, but these prior known adapters have either been impractical to use or have been overly complicated, thereby resulting in a prohibitive cost in the manufacture thereof.

SUMMARY OF THE INVENTION

The fish line re-reeling device embodied in the present invention includes a frame having spaced arms, each of which terminates in an inwardly directed axially aligned hub that is receivable in an axial bore of a fish line supply spool. Interconnected to the arms and located intermediate thereof is a shank that is loosely receivable in an opening formed in an end of an inner section of the fishing rod that is located adjacent to the reel thereof and after disengagement of the outer sections of the fishing rod. The fishing line to be rewound on the reel is transferred directly from the supply spool as located between the arms of the re-reeling device and onto the reel upon rotation of the reel, the frame and supply spool retained therein being swingably movable in an oscillating motion with respect to the fishing rod and reel as the line is transferred from the supply spool to the reel. The oscillating movement of the frame and reel provides for oriented transfer of the line from the supply spool to the reel.

Accordingly, it is an object of the present invention to provide a device for the re-reeling of a fish line from a supply spool to the reel attached to a fishing rod.

Another object of the invention is to provide a re-reeling device for use in winding fishing line from a supply spool onto a fishing reel, wherein the device includes a frame on which a supply spool is mounted, the frame and spool being movable in an oscillating motion during the re-reeling operation to provide for oriented transfer of the line from the spool to the reel.

Another object of the invention is to provide a re-reeling device for winding a fishing line on a fishing rod from a supply spool, wherein appropriate pressure is applied to the spool during the transfer operation so as to maintain a constant tension on the line as it is transferred onto the fishing reel.

Other objects, features and advantages of the invention will become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
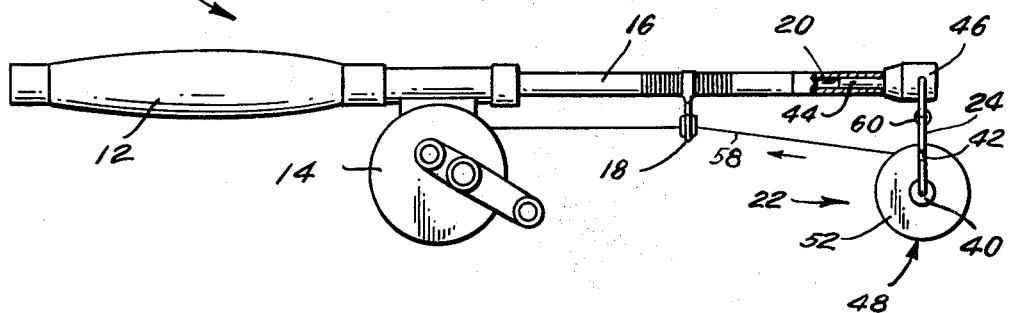
FIG. 1 is an elevational view with a portion shown in section of a fishing rod with the outer rod sections removed, the re-reeling device embodied in the present invention being illustrated in the re-reeling position on the fishing rod.

Referring now to the drawing and particularly to FIG. 1, a conventional fishing rod is generally indicated at 10 and as shown includes a handle 12 on which a reel 14 is mounted for rotation. As is conventional in fishing rods, the pole portion is formed in detachable sections, the innermost of which is indicated at 16. Attached to the pole section 16 is an eye guide 18 through which the fishing line extends. Although not illustrated in the drawing, it is understood that the additional pole sections are interconnected to the inner section 16 for completing the rod assembly when the rod is to be used. As further illustrated in FIG. 1, the rod section 16 is formed wtih an opening, or bore as indicated at 20 in the outer end thereof, the bore 20 being designed to frictionally receive a complementary male portion that is joined to the next rod section, thus interconnecting the rod sections during the assembly of the rod. As will be described hereinafter, the formation of the bore 20 in the rod section 16 enables the re-reeling device as embodied in the present invention to be mounted on the fishing rod during the fish line re-reeling operation.

Fishing line is normally sold as a package and is wound on a supply spool. Since the line must be transferred from the spool to the reel of a fishing rod with the proper tension applied to the line, care must be taken to avoid kinking or entangling the line during the transfer operation.

Figure 2:
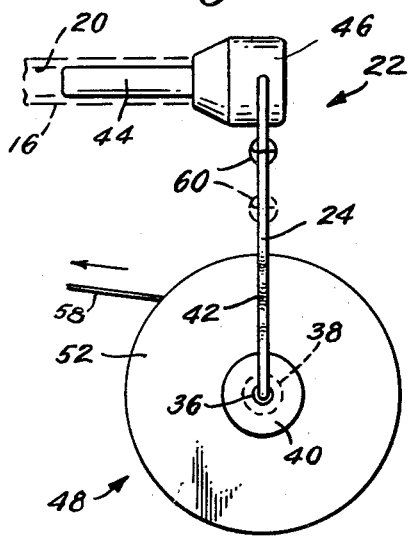
FIG. 2 is an enlarged elevational view of the re-reeling device embodied herein.
Figure 3:
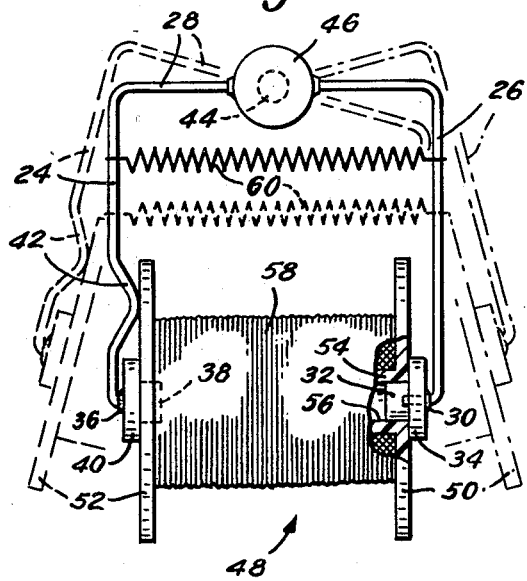
FIG. 3 is a front elevational view of the re-reeling device, the oscillation movement of the device during transfer of the fishing line being illustrated in phantom.

Referring now to FIGS. 2 and 3, the re-reeling device embodied in the present invention is shown in detail and, as illustrated, is indicated generally at 22. The re-reeling device 22 comprises a frame defined by opposed parallel arms 24 and 26 that are interconnected by a bight portion 28. The arm 26 has an inwardly turned end portion 30 to which a hub 32 is joined and on which a flange member 34 is mounted. The arm 24 is similarly formed with an inwardly turned end portion 36 to which a hub 38 is joined and on which a flange member 40 is mounted. Formed intermediate the ends of the arm 24 is an offset portion 42, the purpose of which will be set forth hereinafter.

As more clearly illustrated in FIG. 2, the bight portion 28 includes a shank 44 that is interconnected to an enlarged portion 46 which has a modified frusto-conical configuration; however it is understood that the enlarged portion 46 may be constructed in any convenient shape or form. As will be further described in the operation of the device, the shank 44 is adapted to be received in the bore 20 as formed in the rod section 16, and for this purpose the diameter of the shank 44 is formed slightly less than that of the bore 20 so as to be loosely received therein.

The purpose of the device 22 is to receive a supply spool generally indicated at 48 in mounted relation thereon when fishing line on the supply spool 48 is to be transferred therefrom to the reel 14 on the fishing rod 10. As shown in FIG. 3, the supply spool 48 is conventional in construction and comprises spaced flanges 50 and 52 that are joined to a central core 54 in which a bore 56 is formed. Fishing line indicated at 58 is conventionally wound in any required length on the hub 54 between the flanges 50 and 52. In mounting of the spool 48 on the device 22, the hub portions 32 and 36 are received within the core 54 of the spool so as to provide for rotation of the spool, the flange members 34 and 40 limiting inward movement of the hub portions 32 and 38 and thus providing for firm mounting of the spool 48 on the re-reeling device 22. As further illustrated in FIG. 3, the offset portion 42 of the arm 24 engages the flange 52 of the spool 48 and thus is adapted to restrict rotary movement of the spool 48 as the line 58 is withdrawn from the spool during the re-reeling operation. Since a certain amount of tension is required during withdrawal of the line 58 from the spool 48, this tension may be varied by the force applied by the offset portion 42 to the flange 52. In order to vary the tension of the line 58 as it is removed from the spool 48 onto the reel 14 during the re-reeling operation, a spring 60 is provided and is interconnected between the arms 24 and 26 of the re-reeling device. It is seen that the force applied by the offset portion 42 to the flange 52 of the spool 48 can be varied by shifting the position of the spring 60 with respect to the offset portion 42. Thus, as illustrated in FIG. 3, the force of the offset portion 42 on the flange 52 will be greater when the spring 60 is moved toward the offset portion 42 as represented by the dotted-line position thereof. Since the offset portion 42 will bear against the flange 52 in frictional relation, rotation of the spool 48 will be impeded as the line 58 is removed therefrom, the required tension thus being obtained as the line is rewound on the reel 14 of the fishing rod.

In use of the re-reeling device 22 as embodied in the present invention, the outer sections of the fishing rod 10 are first disconnected, exposing the bore 20 as formed in the inner section 16 that is attached to the handle 12. The re-reeling device 22 with the supply spool 48 mounted between the flanges 34 and 40 of the frame is then located on the rod section 16, the shank 44 being loosely received in the bore 20 as formed in the outer end of the section 16. In this position, the spool 48 will rotate by gravity to the position as illustrated in FIG. 1 and will thus be aligned with respect to the reel 14. The end of the line 58 as wound on the core 54 of the spool 48 is threaded through the guide 18 and secured to the reel 14. The spring 60 is adjusted with respect to the offset portion 48 so that the friction applied by the offset portion 48 to the flange 52 permits the line 58 to be withdrawn from the spool 48 with the required tension during the re-reeling operation. As the reel 14 is rotated during the re-reeling operation, line 58 is removed from the spool 48 in the conventional manner. However, since it is desirable to have the line removed in substantially a straight-line movement as it is fed through the guide 18 onto the reel 14, the re-reeling device with the spool attached thereto is permitted to oscillate with respect to he section 16 as the line is removed therefrom. This oscillating movement is accomplished by the natural unwinding of the line from the spool and further because the shank 44 is loosely received in the bore 20 of the rod section 16. Thus, as the line is moved from the spool 48, the spool oscillates in the motion as shown in dotted lines in FIG. 3, and the line is directed in a straight-line movement through the guide 18 of the fishing rod onto the reel 14. It is understood that the tension of the line 58 as it is removed from the spool 48 may be varied by shifting the position of the spring 60 with respect to the offset portion 46.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. In a fish line re-reeling device for use with a supply spool having a fish line wound thereon, wherein the line is to be transferred from the supply spool to a reel on a fishing rod, said device comprising a frame defined by spaced arms, each of which terminates in an inwardly directed hub that is receivable in an axial bore of said supply spool, a bight portion joined to said spaced arms and having a shank interconnected thereto intermediate said arms, the longitudinal axis of said shank extending in a direction generally perpendicular to a plane in which the arms are located, said shank being receivable in a bore formed in an end of a section of said fishing rod that is located adjacent to the reel thereof, said line being transferred directly from said supply spool to said reel upon rotation of said reel.

2. In a fish line re-reeling device as set forth in claim 1, said shank being loosely receivable in the bore of the fishing rod section, wherein the frame and supply spool retained therein are swingably movable in an oscillating motion with respect to said fishing rod and reel as said line is transferred from said supply spool to said reel, the oscillating movement of said frame and spool providing for oriented transfer of said line from said spool to said reel.

3. In a fish line re-reeling device as set forth in claim 1, one of said arms having an offset portion that engages a flange of said spool in bearing relation for imposing a drag on said spool during the line transfer operation, wherein the line is tensioned during the transfer operation.

4. In a fish line re-reeling device as set forth in claim 3, means engaging said arms for adjustably exerting a compressive action on said arms to vary the pressure of said offset portion on the flange with which it is engaged, thereby adjusting the drag on said spool.

5. In a fish line re-reeling device as set forth in claim 4, said engaging means being defined by a spring that is interconnected to said arms, said spring being generally parallel to the axis of said hubs and being movable in a direction that varies the spacing thereof from the axis of said hubs, wherein the force exerted by said offset portion on the flange with which it is engaged is varied.

6. In a fish line re-reeling device as set forth in claim 1, means joined to at least one of said arms for engaging a flange of said spool for imposing a drag thereon during the line transfer operation, wherein the line is tensioned during the transfer operation.

7. In a fish line re-reeling device as set forth in claim 6 a spring engageable with at least said one arm and urging said engaging means into engagement with said flange.

8. In a fish line re-reeling device as set forth in claim 7 said engaging means being defined by an offset portion joined to said one arm and that is urged into engagement with said flange by said spring.

9. In a fish line re-reeling device as set forth in claim 8 said spring being adjustable relative to said one arm to vary the drag imposed on said spool.

References Cited

UNITED STATES PATENTS

| 300,813 | 6/1884 | Stewart | 242—129.51 X |
| 1,568,309 | 1/1926 | Auld | 242—84.1 |
| 2,248,482 | 7/1941 | Shearer | 242—156 X |
| 2,993,661 | 7/1961 | D'Arrigo | 242—84.1 X |

FOREIGN PATENTS 1,047,023    7/1953    France.

NATHAN L. MINTZ, Primary Examiner